(12) United States Patent
Campbell et al.

(10) Patent No.: US 9,345,265 B2
(45) Date of Patent: May 24, 2016

(54) SUSHI MACHINE

(71) Applicant: 2 Minute Sushi LLC, Grand Junction, CO (US)

(72) Inventors: Deborah Ann Campbell, Grand Junction, CO (US); Charles Everard Campbell, Grand Junction, CO (US); Tia Nadine Salazar, Grand Junction, CO (US); Ian Levon Charles Campbell, Grand Junction, CO (US)

(73) Assignee: 2 MINUTE SUSHI LLC, Grand Junction, CO (US)

( * ) Notice: Subject to any disclaimer, the term of this patent is extended or adjusted under 35 U.S.C. 154(b) by 0 days.

(21) Appl. No.: 14/327,929

(22) Filed: Jul. 10, 2014

(65) Prior Publication Data

US 2015/0027323 A1   Jan. 29, 2015

Related U.S. Application Data

(60) Provisional application No. 61/845,137, filed on Jul. 11, 2013, provisional application No. 61/920,637, filed on Dec. 24, 2013.

(51) Int. Cl.
| | | |
|---|---|---|
| *A21C 9/06* | (2006.01) | |
| *A23P 1/08* | (2006.01) | |
| *A47J 43/20* | (2006.01) | |

(52) U.S. Cl.
CPC . *A23P 1/086* (2013.01); *A47J 43/20* (2013.01)

(58) Field of Classification Search
CPC ................................. A23P 1/086; A47J 43/20
USPC .................. 99/450.6, 450.1, 450.7, 353, 494; 425/110, 319, 383, 436 R, 112, 308
See application file for complete search history.

(56) References Cited

U.S. PATENT DOCUMENTS

| | | | | |
|---|---|---|---|---|
| 2,415,910 | A * | 2/1947 | Roes ................................ | 131/47 |
| 5,381,728 | A * | 1/1995 | Tateno .......................... | 99/450.1 |
| 5,634,396 | A * | 6/1997 | Isobe et al. .................... | 99/450.6 |
| 2009/0050001 | A1* | 2/2009 | Boegli .............................. | 101/6 |

* cited by examiner

*Primary Examiner* — Phuong Nguyen

(57) ABSTRACT

An apparatus for forming filled rolls such as sushi and California rolls. The apparatus contains two rollers connected by a gearing mechanism to aid in creating rolls quickly. The rolls are formed on a continuous mat wrapped around the rollers. The driving roller may be mounted in an adjustable slot to allow the user to make different sized rolls.

18 Claims, 4 Drawing Sheets

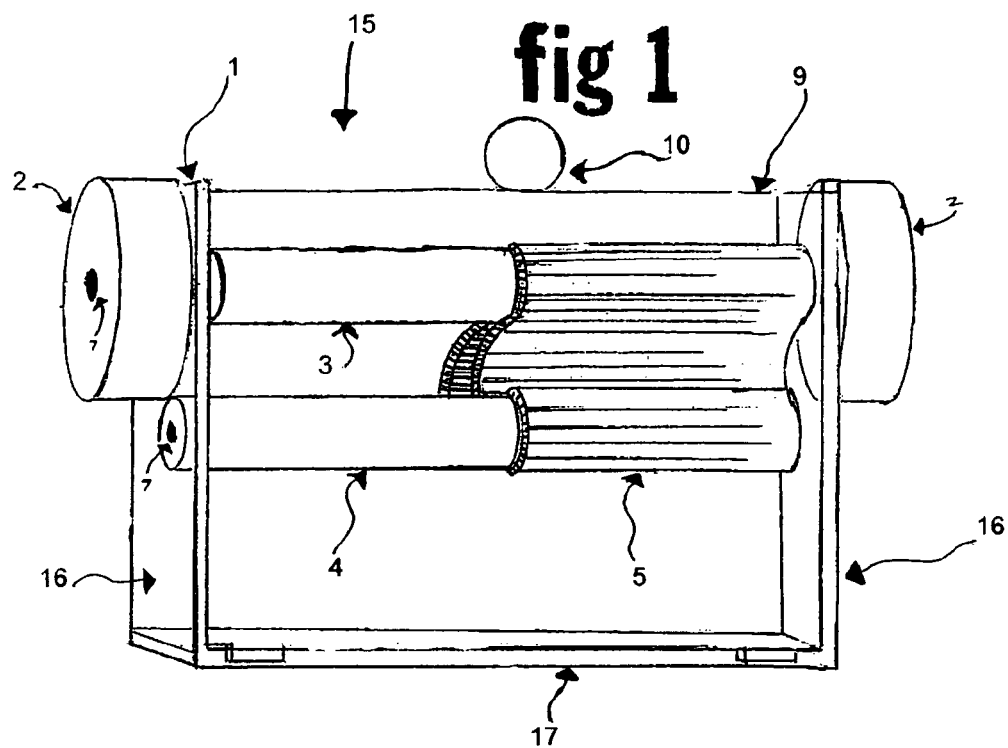
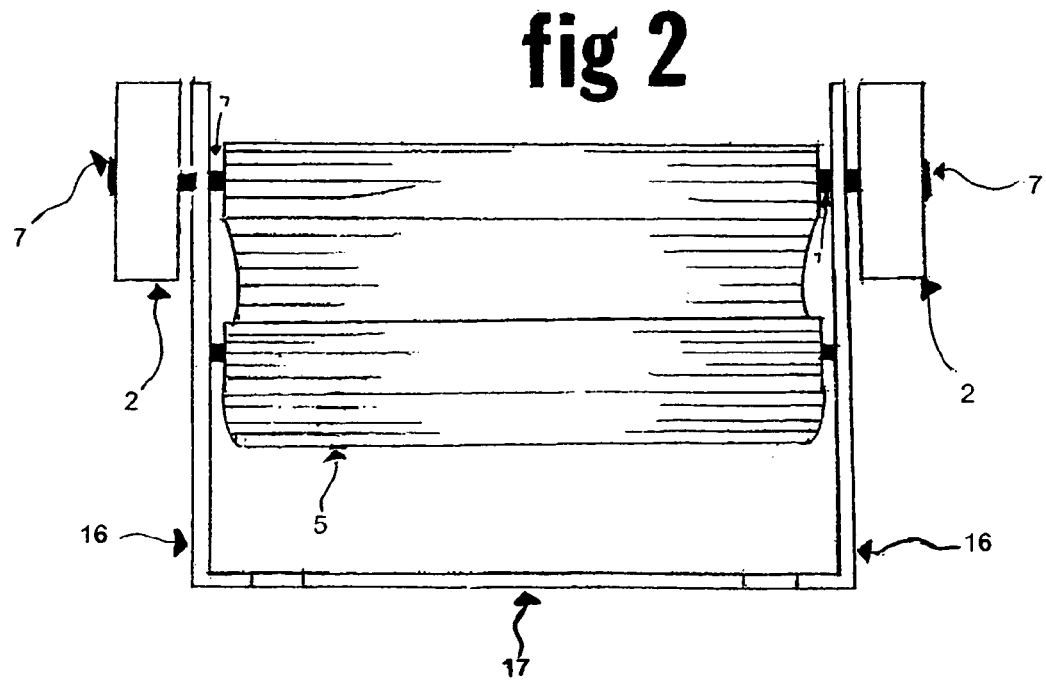

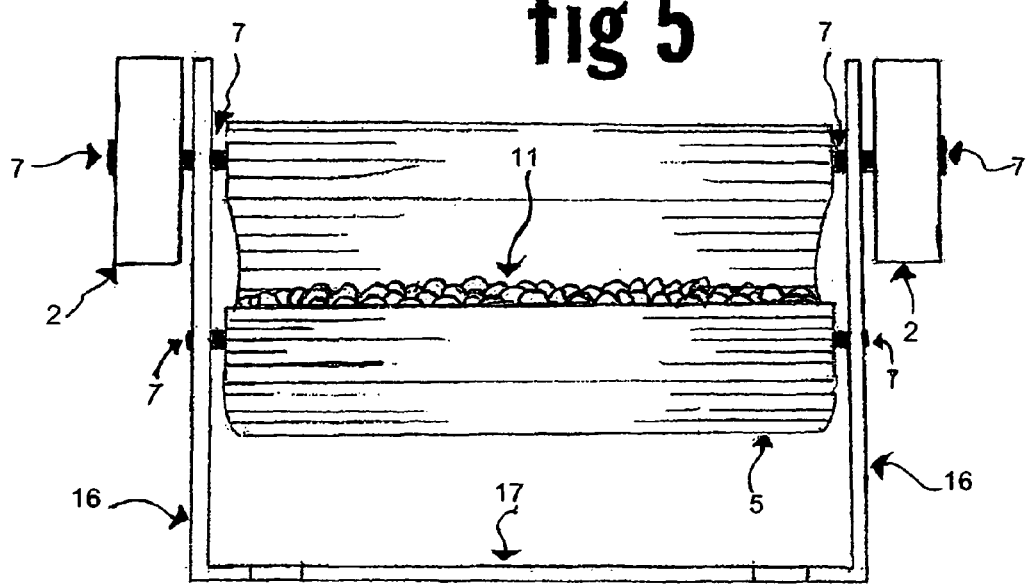
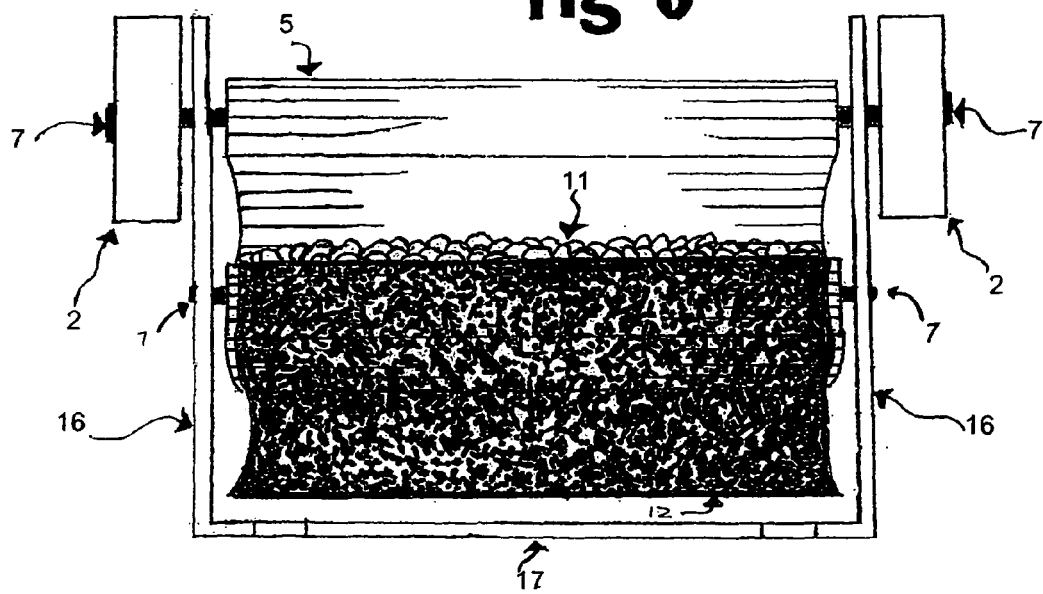

SUSHI MACHINE

REFERENCES CITED

U.S. PATENT DOCUMENTS

| | | | |
|---|---|---|---|
| 2,415,910 | February 1947 | Roes | 131/47 |
| 2,436,015 | February 1948 | Morris | 131/47 |
| 4,516,487 | May 1985 | Madison | 99/450.6 |
| 4,637,304 | January 1987 | Suzuki | 99/450.2 |
| 4,674,967 | June 1987 | Oseka | 425/110 |
| 5,381,728 | January 1995 | Tateno | 99,450.1 |

FOREIGN PATENT DOCUMENTS

| | | | |
|---|---|---|---|
| 466895 | June 1937 | United Kingdom | 131/47 |

BACKGROUND OF THE INVENTION

1. Field of Invention

The invention relates to quick and easy food preparation machines. This invention relates to a machine that can instantly make filled rolls including Sushi and California rolls. Simple, quick, lightweight and portable. The invention comprises commercial and residential use.

2. Description of Prior Art

Several food preparation machines are provided in prior art, including; U.S. Pat. No. 2,415,910 Roes; U.S. Pat. No. 2,436,015 Morris; and U.S. Pat. No. 4,516,487 Madison.

These machines are not suitable for use as instant preparation machines.

SUMMARY OF INVENTION

A primary object of the present invention is to provide an apparatus for forming filled rolls including Sushi and California rolls.

Another object is to simplify the process for forming filled rolls.

A further object is to enable use commercially or in the home.

The housing comprises a facility to adjust the width for the amount of filling to be used and to be able to make different size rolls.

The housing comprises handles, rollers, a continuous mat, a mechanism to aide with heavier rolling processes, and removed for a more delicate rolling process.

The housing comprises a cover for storage.

Attention taken to the fact that the drawings contained are illustrative only, and changes can be made in the construction and described in the claims.

BRIEF DESCRIPTION OF DRAWINGS

FIG. 1 Shows the machine housing (1) in an inoperable state with storage cover (9) and cover knob (10)

FIG. 2 Shows the machine housing (1) open and ready for use. It shows the driver roller (3) and the driven roller (4). The continuous mat (5) around the rollers (3) and (4). The handles (2) are also shown.

FIG. 5 Shows the machine (1) with filling inserted onto continuous mat (5) between rollers (3) (4).

FIG. 6 Shows the wrapper sheet (12) being inserted between the driven roller (4) and the filling (11).

Figure 3:
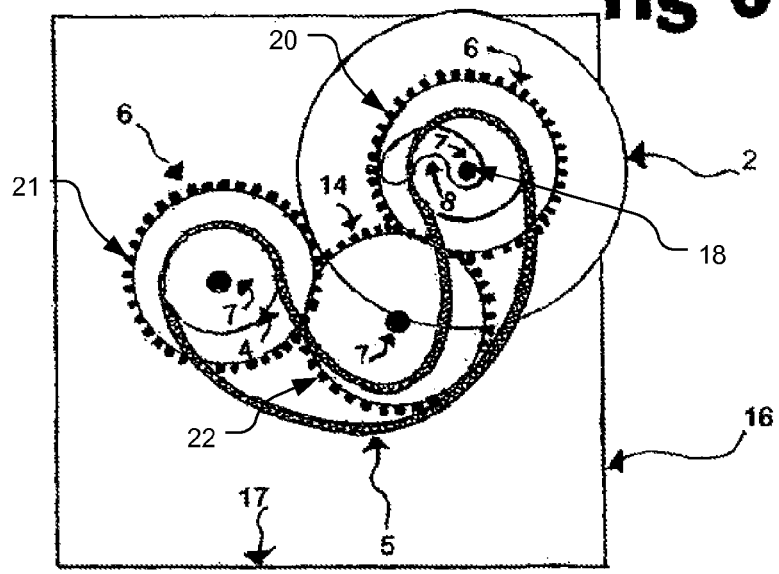
FIG. 3 This figure shows the side view of the housing (1) and the removable gear mechanism (6) that aides turning the rollers (3) and (4). Shows the handle (2) that turns the removable gear mechanism (6). It shows the hardware (7) that holds the handle (2) that goes through the removable gear mechanism (6) and to the driver roller (3) and driven roller (4). It shows the center gear mechanism held to the housing (1) with hardware (7). It shows the continuous mat (5) around the rollers (3) and (4). Shows sizing slot (8).

These are illustrations only. This invention is not limited to the above description.

DETAILED DESCRIPTION

Looking at FIG. 1 this is the apparatus (15) that includes the housing (1) with a storage cover (9) and a cover knob (10). The handles (2) located on both sides of the housing (1) are used to turn the driver roller (3) which in turn turns the driven roller (4). The housing (1) is U shaped. The housing has two parallel sides (16) and a bottom (17).

Two rollers (3) and (4) are placed horizontally within the housing. There is a sizing slot (8) within the housing located on the parallel sides (16) of the housing (1).

In FIG. 2 The handles (2) have hardware (7) that pass through the handle (2) and top gear in the comprising mechanism (6). The hardware (7) then passes through the housing (1) by way of the sizing slot (8). The handles (2) with the hardware (7) pass through the housing (1) by way of the sizing slot (8) and into the ends of the driver roller (3). The handles are moved closer or further away from the driven roller (4) by sliding the handles (2) forward or back within the sizing slot (8). The driven roller (4) is attached to the lower side of the parallel sides (16) within the housing (1). The hardware (7) for the driven roller (4) is first inserted into the lower part of the mechanism (6) then into the housing (1) and attached to each end of the driven roller (4).

As shown in FIG. 3 the removable center gear (14) is in the center of the top and bottom of the mechanism (6) and is needed for the gear mechanism to fully engage. The removable center gear (14) is attached to the housing (1) with hardware (7).

Figure 4:
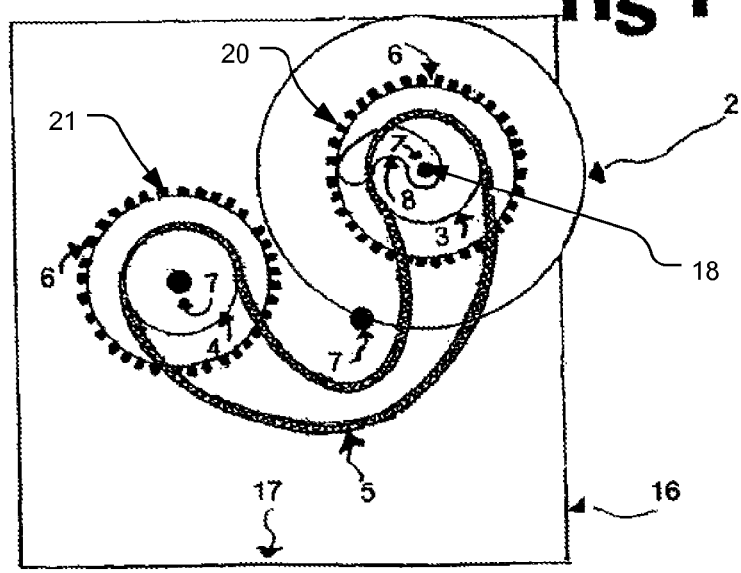
FIG. 4 Shows the side view of the housing (1) with the removable gear mechanism (6) disabled by removing center gear (14) from housing (1). This enables the rollers (3) and (4) to turn without the aide of the gear mechanism (6) for delicate rolling operations.

FIG. 4 shows the apparatus (15) with the removable center gear (14) removed. When the gear is removed it disengages the gear mechanism (6). The removable center gear (14) is easily removed from the parallel sides (16) by easily removing the hardware (7). The continuous mat (5) then rolls more slowly when the handles are turned for delicate operations.

As shown is FIG. 5 the driver roller (3) is opened to the furthest point from the driven roller (4) by pushing the handles (2) back within the sizing slot (8). The filler is inserted onto the continuous mat (5) between the rollers (3) and (4) and within the parallel sides (16). The driver roller (3) is then pulled forward, closer to the driven roller (4) by sliding the handles (2) forward within the sizing slot (8).

Figure 7:
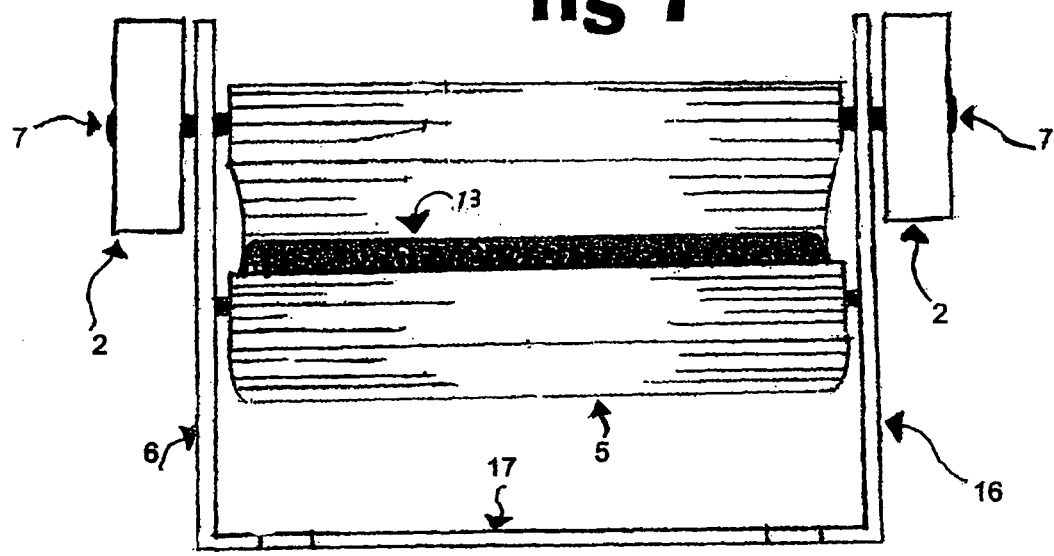
FIG. 7 Shows the rolling process completed with the filled roll (13) on continuous mat (5).

FIG. 6 shows the edge of the wrapper (12) being placed between the back of the driven roller (4) and over the filling (11) that is on the continuous mat (5). By turning both handles in the same direction, the wrapper (12) is pulled onto the continuous mat (5) and quickly and easily wraps around the filling (11) completing the roll as shown in FIG. 7.

The handles (2) are then returned back to the widest size in the sizing slot (8) allowing the finished product (13) to be removed.

Figure 8:
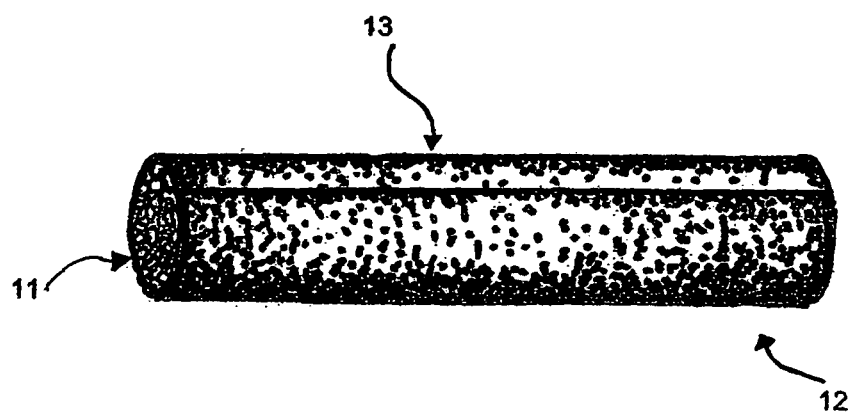
FIG. 8 Shows a completed filled roll (13) with wrapper sheet (12) and filling (11).

FIG. 8 shows a neat, tight wrapped, finished product (13) removed from the apparatus (15).

REFERENCE NUMBERS

1. Housing
2. Handles
3. Roller driver
4. Roller driven
5. Continuous mat
6. Gear mechanism
7. Hardware
8. Sizing slot
9. Cover
10. Cover knob
11. Filling
12. Wrapper
13. Finished product
14. Removable center gear
15. Apparatus
16. Parallel sides
17. Bottom Though features of this invention are described above, this invention is not limited to the details above.

What is claimed is a new invention and in hopes of being protected by a patent:

1. An apparatus for forming filled rolls including sushi rolls, said apparatus comprising:
    a housing with opposite sides comprising a driving roller and a driven roller;
    a continuous mat wrapped around the driving roller and the driven roller the housing comprising adjustable slots in the opposite sides for different sized rolls;
    a mechanism that comprises:
        a first gear connected to the driving roller;
        a second gear that does not contact the first gear and that is connected to the driven roller; and
        a third gear movably connected to one of the opposite sides and meshing with the first and second gears, to assist in rolling, wherein the third gear meshing with the first and second gears includes that the third gear touch the first and second gears, wherein the third gear does not include a roller;
    a first hardware that extends through the driving roller and attaches the driving roller to each of the opposite sides, wherein the first hardware further attaches the first gear to the driving roller;
    a second hardware that extends through the driven roller and attaches the driven roller to each of the opposite sides, wherein the second hardware further attaches the second gear to the driven roller; and
    a cover for storage, wherein the cover is removably attached to the housing.

2. The apparatus as recited in claim 1, wherein the opposite sides include the adjustable slots, wherein a stub shaft at each end of the driving roller extends into the adjustable slots.

3. The apparatus as recited in claim 2, wherein the driving roller is configured to move between a first position and a second position within the adjustable slots.

4. The apparatus as recited in claim 3, wherein the driving roller is closest to the driven roller when located in the first position and furthest away from the driven roller when located in the second position.

5. The apparatus as recited in claim 1, wherein the mechanism is located on an exterior portion of the side of the housing of the apparatus.

6. The apparatus as recited in claim 1, wherein the third gear is removable.

7. The apparatus as recited in claim 1, wherein a handle is located on at least one end of the driving roller.

8. An apparatus for forming filled rolls, including sushi rolls, said apparatus comprising:
    a housing including opposite sides and a bottom, where the opposite sides are attached to each other via the bottom;
    a cover that is removably attached to the housing;
    two rollers mounted between the opposite sides, the two rollers include a driving roller and a driven roller;
    a handle attached to each end of the driving roller, wherein movement of the handle causes the driving roller to rotate;
    a gearing mechanism, wherein the gearing mechanism comprises:
        a first gear, wherein the first gear is attached to the driving roller;
        a second gear, wherein the second gear is attached to the driven roller; and
        a third gear, wherein the third gear does not include a roller;
        wherein the first gear, the second gear, and the third gear are located on the same side of the housing;
        wherein the first gear does not mesh with the second gear; and
        wherein the third gear meshes with the first gear and the second gear to cause the two rollers to move, wherein the third gear meshing with the first gear and the second gear includes that the third gear touching the first gear and the second gear; and
    a first hardware attaches the first gear to the driving roller and the handle;
    a second hardware attaches the driven roller to the second gear; and
    a continuous mat wraps around the driving roller and the driven roller.

9. The apparatus as recited in claim 8, wherein the opposite sides include adjustable slots, wherein the first hardware extends through the adjustable slots.

10. The apparatus as recited in claim 8, wherein the gearing mechanism is located on the exterior of the housing.

11. The apparatus as recited in claim 8, wherein the handle is located on at least one end of the driving roller.

12. The apparatus as recited in claim 8, wherein the third gear is removable.

13. A system for forming filled rolls for human consumption, the system comprising:
    a housing including a first side and a second side;
    a cover removably attached to the housing;
    a first roller attached to the first side and the second side;
    a second roller attached to the first side and the second side;
    a continuous mat, wherein the continuous mat wraps around the first roller and the second roller;
    a first gear attached to at least a first end of the first roller on the first side of the housing;
    a second gear attached to at least a primary end of the second roller on the first side of the housing;
    a third gear attached to at least the first side of the housing, wherein third teeth of the third gear interlock with first teeth of the first gear and the third teeth interlock with second teeth of the second gear, and further wherein the third gear does not include a roller, wherein the first teeth of the first gear do not interlock with the second teeth of the second gear;
a first hardware that extends through the first roller and attaches the first roller to each of the first and second sides, wherein the first hardware further attaches the first gear to the first roller; and
a second hardware that extends through the second roller and attaches the second roller to each of the first and second sides, wherein the second hardware further attaches the second gear to the second roller.

14. The system as recited in claim 13, wherein the first side and the second side include adjustable slots, wherein the first roller is attached to the first side and the second side through the adjustable slots.

15. The system as recited in claim 13, wherein the third gear is removable.

16. The system as recited in claim 13, wherein the first gear, the second gear, and the third gear are located on an exterior of the housing on the first side.

17. The system as recited in claim 13, wherein a handle is located on at least one end of the first roller.

18. The system as recited in claim 13, wherein the first gear and the second gear are removable.

\* \* \* \* \*